(12) United States Patent
Shim et al.

(10) Patent No.: US 10,678,725 B2
(45) Date of Patent: Jun. 9, 2020

(54) INTERFACE CIRCUIT RELATING TO VARIABLE DELAY, AND SEMICONDUCTOR APPARATUS AND SYSTEM INCLUDING THE SAME

(71) Applicant: SK hynix Inc., Icheon-si Gyeonggi-do (KR)

(72) Inventors: Jong Joo Shim, Icheon-si (KR); Hyung Soo Kim, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 190 days.

(21) Appl. No.: 15/279,965

(22) Filed: Sep. 29, 2016

(65) Prior Publication Data

US 2017/0371817 A1 Dec. 28, 2017

(30) Foreign Application Priority Data

Jun. 22, 2016 (KR) .................. 10-2016-0078070

(51) Int. Cl.
*G06F 13/36* (2006.01)
*G11C 7/22* (2006.01)
*G06F 13/40* (2006.01)

(52) U.S. Cl.
CPC .......... *G06F 13/36* (2013.01); *G06F 13/4068* (2013.01)

(58) Field of Classification Search
None
See application file for complete search history.

(56) References Cited

U.S. PATENT DOCUMENTS

| 6,212,127 | B1* | 4/2001 | Funaba ................. G11C 7/1072 365/194 |
| 6,404,248 | B1* | 6/2002 | Yoneda ................. H03L 7/0814 327/158 |
| 7,015,740 | B1* | 3/2006 | Feinberg .......... G01R 31/31725 327/261 |
| 7,468,957 | B2* | 12/2008 | Baba ........................ H04B 3/23 370/286 |
| 7,558,326 | B1* | 7/2009 | Lyle ...................... H04L 1/0057 348/469 |
| 7,948,862 | B2 | 5/2011 | Parnaby |
| 2003/0208717 | A1* | 11/2003 | Klotchkov ....... G01R 31/31725 714/814 |
| 2005/0190875 | A1* | 9/2005 | Feiereisel ............. H04J 3/0682 375/356 |
| 2006/0018407 | A1* | 1/2006 | Osaka .................... H03K 5/082 375/316 |
| 2008/0090468 | A1* | 4/2008 | Reeves .............. H01R 13/6464 439/676 |
| 2008/0232233 | A1* | 9/2008 | Spirkl ...................... G11C 7/02 370/201 |
| 2011/0069604 | A1* | 3/2011 | Schmukler ........... H03H 11/265 370/201 |

(Continued)

*Primary Examiner* — Michael Sun
(74) *Attorney, Agent, or Firm* — William Park & Associates Ltd.

(57) ABSTRACT

A semiconductor apparatus may include an interface circuit. The interface circuit may sense level variations of a first signal and a second signal. The interface circuit may generate first and second output signals by variably delaying the first and second signals depending on a sensing result. The interface circuit may transmit the first and second output signals to first and second signal transmission lines which are adjacent to each other.

21 Claims, 9 Drawing Sheets

(56) References Cited

U.S. PATENT DOCUMENTS

| | | | |
|---|---|---|---|
| 2011/0234257 A1 | 9/2011 | Kwon et al. | |
| 2012/0044984 A1* | 2/2012 | Zerbe | H04L 1/0026 |
| | | | 375/233 |
| 2012/0251031 A1* | 10/2012 | Suarez | H04B 1/525 |
| | | | 385/3 |
| 2013/0147547 A1* | 6/2013 | Nalawade | G06F 17/5063 |
| | | | 327/551 |

* cited by examiner

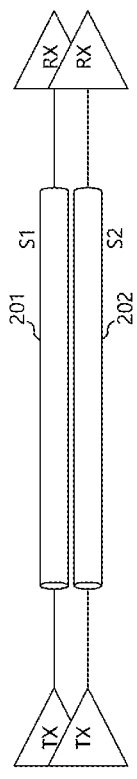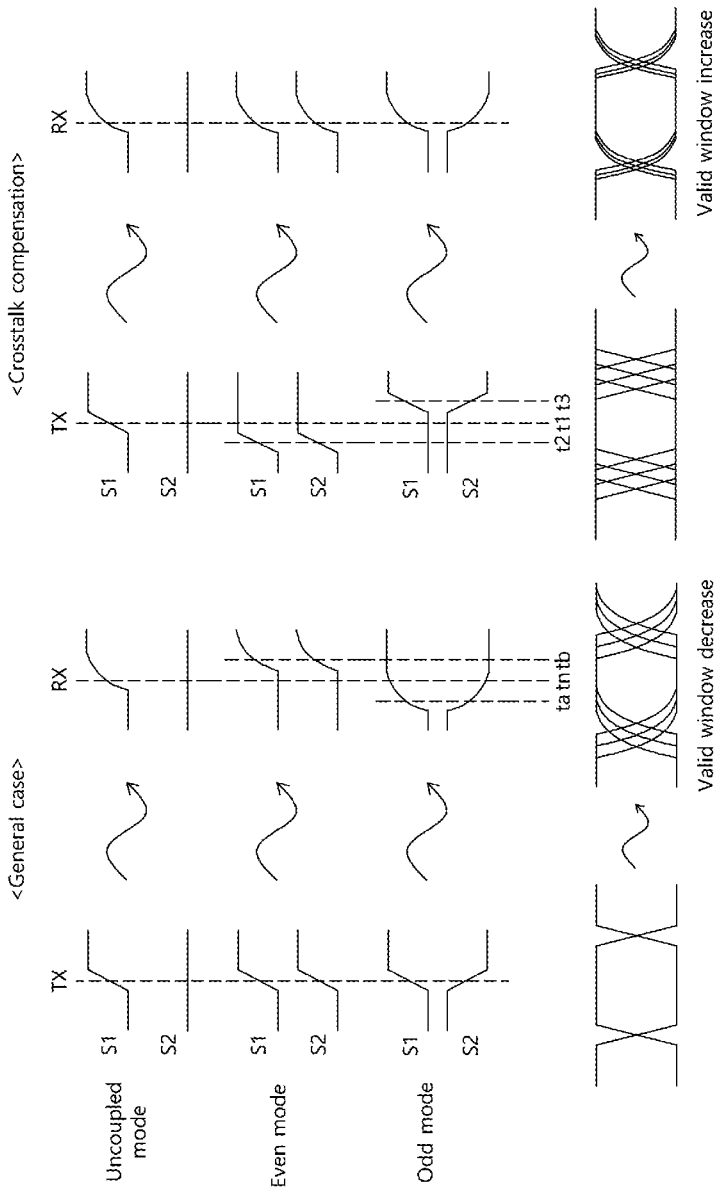
FIG.2

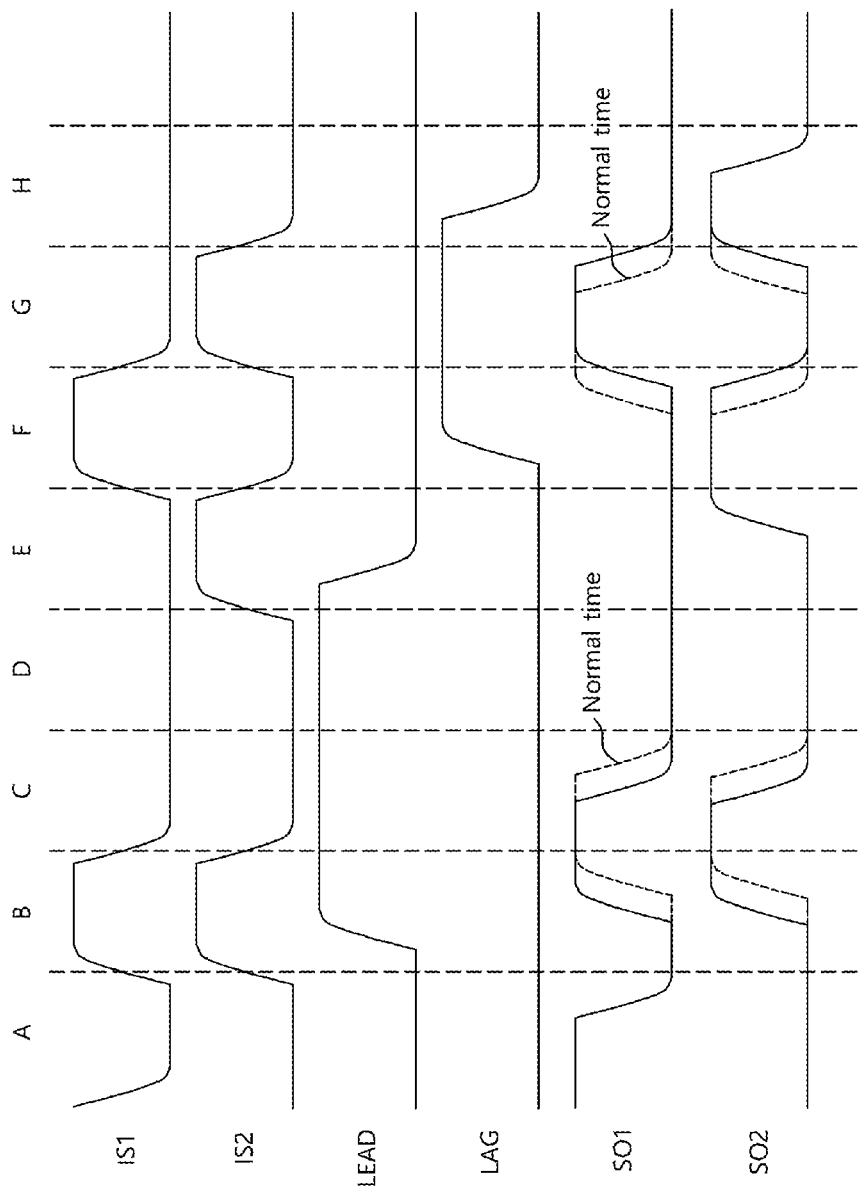

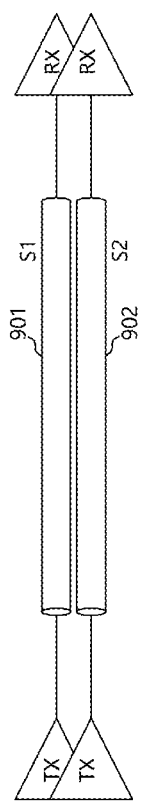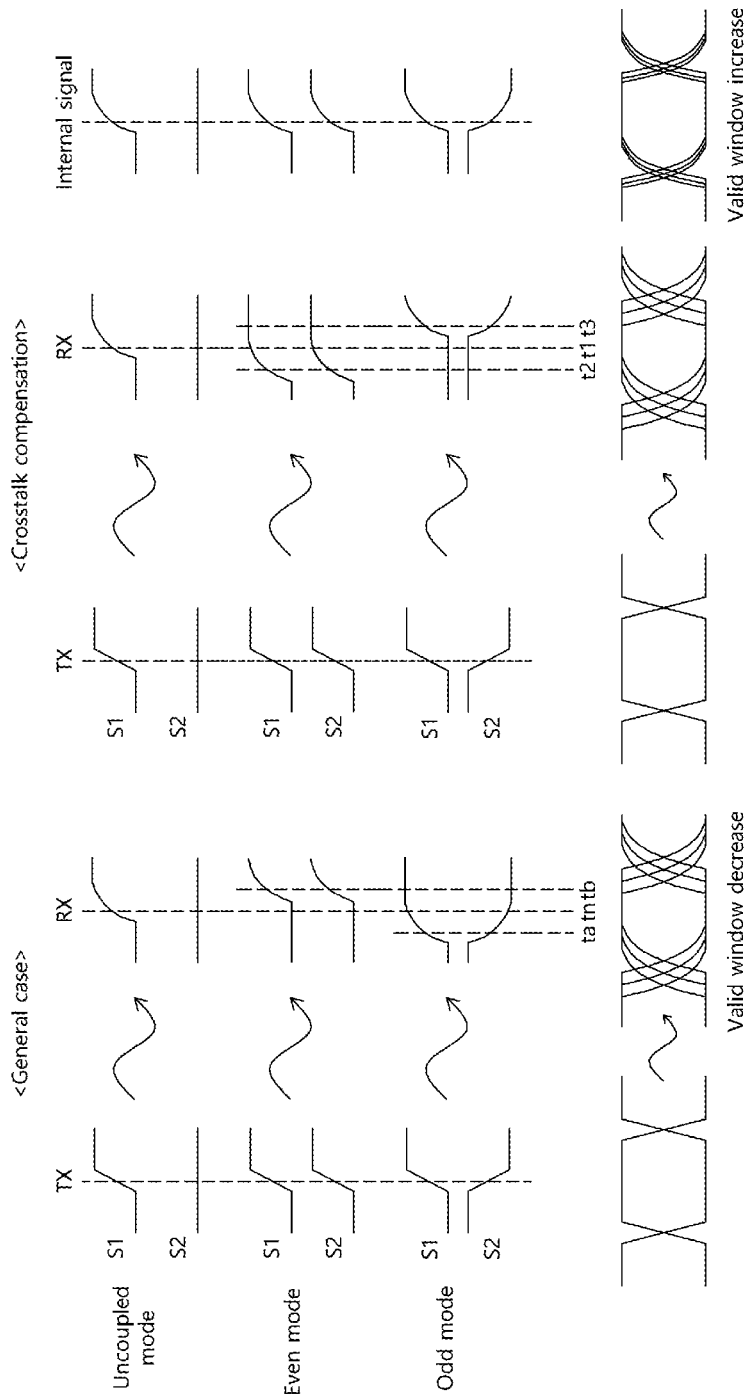
FIG.9

INTERFACE CIRCUIT RELATING TO VARIABLE DELAY, AND SEMICONDUCTOR APPARATUS AND SYSTEM INCLUDING THE SAME

CROSS-REFERENCES TO RELATED APPLICATION

The present application claims priority under 35 U.S.C. § 119(a) to Korean application number 10-2016-0078070, filed on Jun. 22, 2016, in the Korean Intellectual Property Office, which is incorporated herein by reference in its entirety.

BACKGROUND

1. Technical Field

Various embodiments may generally relate to a semiconductor technology, and, more particularly, to an interface circuit, and a semiconductor apparatus and a system including the same.

2. Related Art

Electronic apparatuses consist of a large number of electronic components. Among the electronic apparatuses, a computer system consists of many electronic components which are constructed by semiconductors. Semiconductor apparatuses communicate by being coupled through a link or a bus. The link or bus consists of a plurality of signal transmission lines, and the semiconductor apparatuses transmit signals at high speeds through the signal transmission lines. Due to this fact, as adjacent signal transmission lines interfere with each other or are coupled with each other, crosstalk may occur. A recent technology trend is to develop a semiconductor apparatus capable of operating at high speeds while consuming less power. The frequency of a signal transmitted between semiconductor apparatuses is being gradually increased as the semiconductor apparatuses operate at high speeds, and the amplitude of a signal transmitted between semiconductor apparatuses is being gradually decreased as the semiconductor apparatuses use less power. Therefore, noise by a crosstalk gradually increases, and this may serve as a factor that adversely influences the precision of the communication between semiconductor apparatuses. Also, depending on channel circumstances such as the type, length and coupling of signal transmission lines, crosstalks may occur in a variety of ways.

SUMMARY

In an embodiment, a semiconductor apparatus may be provided. The semiconductor apparatus may include an interface circuit configured to sense level variations of a first signal and a second signal. The interface circuit may generate first and second output signals by variably delaying the first and second signals depending on a sensing result. The interface circuit may transmit the first and second output signals to first and second signal transmission lines which are adjacent to each other.

In an embodiment, a semiconductor apparatus may be provided. The semiconductor apparatus may include an interface circuit may be configured to receive a first input signal and a second input signal transmitted through first and second signal transmission lines which are adjacent to each other. The interface circuit may be configured to generate first and second signals by variably delaying the first and second input signals based on level variations of the first and second input signals.

BRIEF DESCRIPTION OF THE DRAWINGS

FIG. 2 is a diagram illustrating a representation of an example of a crosstalk occurring between signal transmission lines and a concept for compensating for the crosstalk at the sides of transmitter circuits.

FIG. 8 is a representation of an example of a timing diagram to assist in the explanation of an operation of an interface circuit in accordance with an embodiment.

FIG. 9 is a diagram illustrating a representation of an example of a crosstalk occurring between signal transmission lines and a concept for compensating for the crosstalk at the sides of receiver circuits.

DETAILED DESCRIPTION

Hereinafter, an interface circuit capable of compensating for a crosstalk, and a semiconductor apparatus and a system including the same will be described below with reference to the accompanying drawings through various examples of embodiments.

Embodiments may provide an interface circuit capable of compensating for a crosstalk, by variably delaying and then transmitting signals or variably delaying and then receiving signals according to level variations of the signals to be transmitted through adjacent signal transmission lines, and a semiconductor apparatus and a system including the same.

Figure 1:
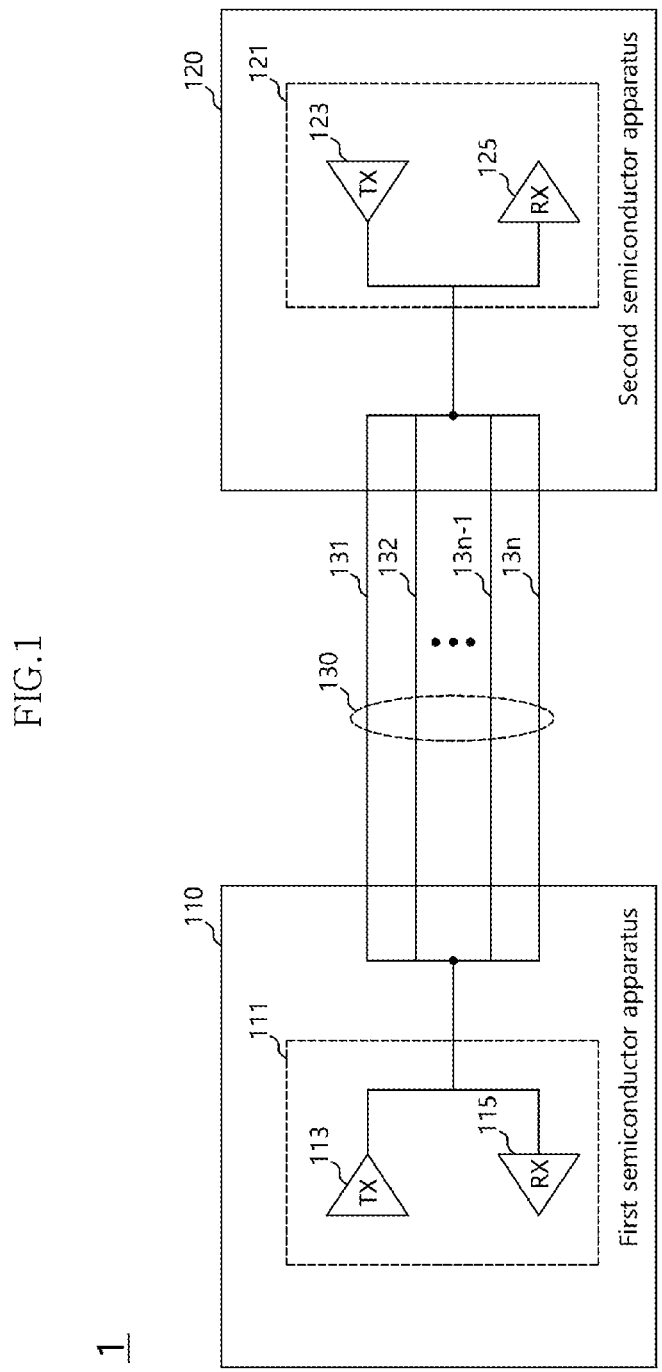
FIG. 1 is a diagram illustrating a representation of an example of the configuration of a system in accordance with an embodiment.

FIG. 1 is a diagram illustrating a representation of an example of the configuration of a system in accordance with an embodiment. Referring to FIG. 1, a system 1 in accordance with an embodiment may include a first semiconductor apparatus 110 and a second semiconductor apparatus 120. The first semiconductor apparatus 110 and the second semiconductor apparatus 120 may be electronic components which communicate with each other. In an embodiment, the first semiconductor apparatus 110 may be a master device, and the second semiconductor apparatus 120 may be a slave device which operates by being controlled by the first semiconductor apparatus 110. For example, the first semiconductor apparatus 110 may be a host such as a processor, and the processor may include a central processing unit (CPU), a graphic processing unit (GPU), a multimedia processor (MMP) or a digital signal processor (DSP). Also, the first semiconductor apparatus 110 may be realized in the form of a system-on-chip (SOC) by combining processor chips having various functions, such as application processors. The second semiconductor apparatus 120 may be a memory, and the memory may include a volatile memory or a nonvolatile memory. The volatile memory may include an SRAM (static RAM), a DRAM (dynamic RAM) or an SDRAM (synchronous DRAM), and the nonvolatile memory may include a ROM (read only memory), a PROM (programmable ROM), an EEPROM (electrically erasable and programmable ROM), an EPROM (electrically programmable ROM), a flash memory, a PRAM (phase change RAM), an MRAM (magnetic RAM), an RRAM (resistive RAM) or an FRAM (ferroelectric RAM), etc.

The first and second semiconductor apparatuses 110 and 120 may be coupled with each other through a bus 130. The bus 130 may include a plurality of signal transmission lines 131, 132, 13n-1 and 13n. The bus 130 may be a channel or a link. The first and second semiconductor apparatuses 110 and 120 may include pads, and the bus 130 may be coupled between the pads of the first and second semiconductor apparatuses 110 and 120. The first semiconductor apparatus 110 may include an interface circuit 111 for communicating with the second semiconductor apparatus 120. The interface circuit 111 may include a transmitter circuit TX 113 and a receiver circuit RX 115. The transmitter circuit 113 may generate an output signal according to an internal signal of the first semiconductor apparatus 110, and transmit the output signal to the second semiconductor apparatus 120 through the bus 130. The receiver circuit 115 may receive the signal transmitted from the second semiconductor apparatus 120 through the bus 130, and generate an internal signal. Similarly, the second semiconductor apparatus 120 may include an interface circuit 121 for communicating with the first semiconductor apparatus 110. The interface circuit 121 may include a transmitter circuit TX 123 and a receiver circuit RX 125. The transmitter circuit 123 may generate an output signal according to an internal signal of the second semiconductor apparatus 120, and transmit the output signal to the first semiconductor apparatus 110 through the bus 130. The receiver circuit 125 may receive the signal transmitted from the first semiconductor apparatus 110 through the bus 130, and generate an internal signal.

The bus 130 may be, for example, a data bus. The transmitter circuit 113 of the first semiconductor apparatus 110 may transmit the internal data of the first semiconductor apparatus 110 to the second semiconductor apparatus 120, and the receiver circuit 115 of the first semiconductor apparatus 110 may receive the data transmitted from the second semiconductor apparatus 120. The transmitter circuit 123 of the second semiconductor apparatus 120 may transmit the internal data of the second semiconductor apparatus 120 to the first semiconductor apparatus 110, and the receiver circuit 125 of the second semiconductor apparatus 120 may receive the data transmitted from the first semiconductor apparatus 110. The first and second semiconductor apparatuses 110 and 120 may perform serial communication, and the bus 130 may transmit data of a serial type. In order to quickly process a large amount of data, the first and second semiconductor apparatuses 110 and 120 may convert data of a serial type into data of a parallel type and use the data of the parallel type. Each of the interface circuits 111 and 121 may include a parallelizer for converting data of a serial type into data of a parallel type. Each of the interface circuits 111 and 121 may include a serializer for converting data of a parallel type into data of a serial type.

The bus 130 may include the plurality of signal transmission lines 131, 132, 13n-1 and 13n. The interface circuit 111 may include a plurality of transmitter circuits and a plurality of receiver circuits, and each pair of transmitter circuit and receiver circuit may be coupled with each of the signal transmission lines 131, 132, 13n-1 and 13n. Different signals may be transmitted through the plurality of signal transmission lines 131, 132, 13n-1 and 13n. For example, different data may be transmitted through the plurality of signal transmission lines 131, 132, 13n-1 and 13n. The signal transmission lines 131 and 132 may be adjacent to each other, and the signal transmission lines 13n-1 and 13n may be adjacent to each other. When signals or data are transmitted through adjacent signal transmission lines, noise by crosstalk may be generated due to a coupling phenomenon of the adjacent signal transmission lines. The crosstalk may occur in a variety of ways according to levels of the signals or data transmitted through the adjacent signal transmission lines.

FIG. 2 is a diagram illustrating a representation of an example of crosstalk occurring between signal transmission lines and a concept for compensating for the crosstalk at the sides of transmitter circuits. Referring to FIG. 2, two signal transmission lines may be adjacent signal transmission lines. A first signal S1 may be transmitted through a first signal transmission line 201, and a second signal S2 may be transmitted through a second signal transmission line 202. The first and second signal transmission lines 201 and 202 may be coupled with transmitter circuits TX and receiver circuits RX for transmitting and receiving the first and second signals S1 and S2. A scheme in which the first and second signals S1 and S2 are transmitted may be any one of the case where the level of only any one signal varies, the case where two signals vary to have the same level and the case where two signals vary to have different levels. An uncoupled mode may mean the case where the level of only any one of the first and second signals S1 and S2 varies, an even mode may mean the case where the first and second signals S1 and S2 vary to have the same level, and an odd mode may mean the case where the first and second signals S1 and S2 vary to have different levels. In the uncoupled mode, when the level of only the first signal S1 of the first and second signals S1 and S2 varies to a high level, a coupling between the first and second signal transmission lines 201 and 202 may not occur. Therefore, the receiver circuits RX may receive the first and second signals S1 and S2 at a reference time tn. In the even mode, when both the first and second signals S1 and S2 vary from a low level to a high level, due to a coupling phenomenon or crosstalk of the first and second signal transmission lines 201 and 202, the receiver circuits RX may receive the first and second signals S1 and S2 at a time tb later than the reference time tn. In the odd mode, when the first signal S1 varies from a low level to a high level and the second signal S2 varies from a high level to a low level, due to a coupling phenomenon or crosstalk of the first and second signal transmission lines 201 and 202, the receiver circuits RX may receive the first and second signals S1 and S2 at a time to earlier than the reference time tn. As described above, even though the transmitter circuits TX drive the first and second signal transmission lines 201 and 202 and transmit the first and second signals S1 and S2 at the same time, the receiver circuits RX may receive the first and second signals S1 and S2 at different times due to the coupling phenomenon or crosstalk of the first and second signal transmission lines 201 and 202 induced by variations in the levels of the first and second signals S1 and S2. Accordingly, the valid windows or durations of the received signals S1 and S2 may be decreased, and the transmission performance between the transmitter circuits TX and the receiver circuits RX may be degraded.

An interface circuit in accordance with an embodiment may transmit the first and second signals S1 and S2 after compensating for a crosstalk likely to occur due to level variations of the first and second signals S1 and S2, at the sides of the transmitter circuits TX. In the uncoupled mode, since a transmission delay does not occur in the first and second signals S1 and S2, the interface circuit may drive the first and second signal transmission lines 201 and 202 at a normal time t1. In the even mode, in consideration of that transmission of the first and second signals S1 and S2 is relatively delayed, the interface circuit may drive the first and second signal transmission lines 201 and 202 at an earlier time t2 than the normal time t1. In the odd mode, in consideration of that transmission of the first and second signals S1 and S2 is relatively quickened, the interface circuit may drive the first and second signal transmission lines 201 and 202 at a later time t3 than the normal time t1. Therefore, by adjusting the transmission time of the first and second signals S1 and S2, the interface circuit may cause the first and second signals S1 and S2 to be received at the sides of the receiver circuits RX at a time close to the reference time tn, regardless of the coupling or crosstalk of the adjacent signal transmission lines 201 and 202. As a consequence, the interface circuit may increase the valid windows or durations of the first and second signals S1 and S2 received at the sides of the receiver circuits RX, and thereby may improve communication performance.

Figure 3:
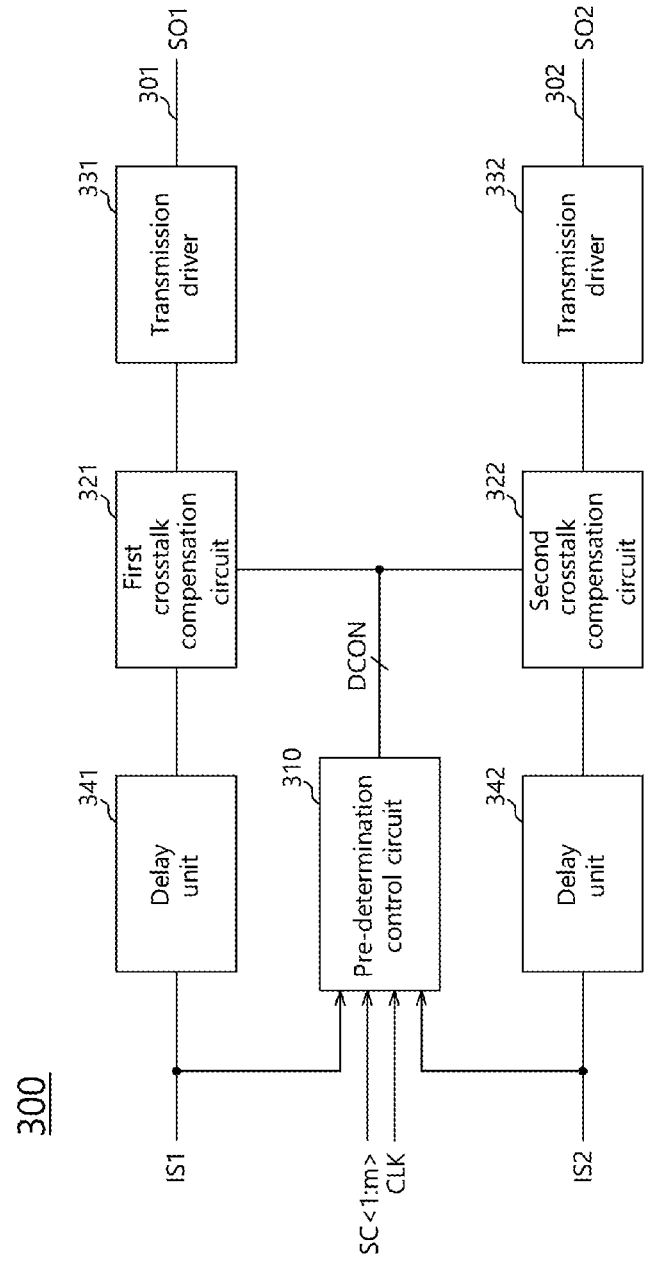
FIG. 3 is a diagram illustrating a representation of an example of the configuration of an interface circuit in accordance with an embodiment.

FIG. 3 is a diagram illustrating a representation of an example of the configuration of an interface circuit 300 in accordance is with an embodiment. Referring to FIG. 3, the interface circuit 300 may include a configuration for a transmitter circuit. The interface circuit 300 may sense level variations of a first internal signal IS1 and a second internal signal IS2, and, by variably delaying the first and second internal signals IS1 and IS2 depending on a sensing result, may generate a first output signal SO1 and a second output signal SO2. The interface circuit 300 may output the first and second output signals SO1 and SO2 to a first signal transmission line 301 and a second signal transmission line 302, respectively. The first and second output signals SO1 and SO2 may be transmitted to an external semiconductor apparatus through the first and second signal transmission lines 301 and 302. The first and second signal transmission lines 301 and 302 may be disposed adjacent to each other.

The interface circuit 300 may variably delay the first and second internal signals IS1 and IS2 based on level variations of the first and second internal signals IS1 and IS2. When the first and second internal signals IS1 and IS2 vary to the same level, the interface circuit 300 may delay the respective first and second internal signals IS1 and IS2 by a first delay amount, and generate the first and second output signals SO1 and SO2. When the level of only any one of the first and second internal signals IS1 and IS2 varies, the interface circuit 300 may delay the respective first and second internal signals IS1 and IS2 by a second delay amount, and generate the first and second output signals SO1 and SO2. When the first and second internal signals IS1 and IS2 vary to different levels from each other, the interface circuit 300 may delay the respective first and second internal signals IS1 and IS2 by a third delay amount, and generate the first and second output signals SO1 and SO2. The second delay amount may be larger than the first delay amount, and the third delay amount may be larger than the second delay amount. The interface circuit 300 may delay the first and second internal signals IS1 and IS2 by the second delay amount in the uncoupled mode, and generate the first and second output signals SO1 and SO2. The interface circuit 300 may delay the first and second internal signals IS1 and IS2 by the first delay amount smaller than the second delay amount in the even mode, and generate the first and second output signals SO1 and SO2, such that the first and second internal signals IS1 and IS2 may be transmitted earlier than a normal time. The interface circuit 300 may delay the first and second internal signals IS1 and IS2 by the third delay amount larger than the second delay amount in the odd mode, and generate the first and second output signals SO1 and SO2, such that the first and second internal signals IS1 and IS2 may be transmitted later than the normal time.

Referring to FIG. 3, the interface circuit 300 may include a pre-determination control circuit 310, a first crosstalk compensation circuit 321, and a second crosstalk compensation circuit 322. The pre-determination control circuit 310 may receive the first and second internal signals IS1 and IS2, and generate a delay control signal DCON. The pre-determination control circuit 310 may sense level variations of the first and second internal signals IS1 and IS2, and generate the delay control signal DCON depending on a sensing result. The first crosstalk compensation circuit 321 may variably delay the first internal signal IS1 based on the delay control signal DCON, and generate the first output signal SO1. The second crosstalk compensation circuit 322 may variably delay the second internal signal IS2 based on the delay control signal DCON, and generate the second output signal SO2. The delay control signal DCON may include a plurality of delay signals.

The pre-determination control circuit 310 may further receive selection codes SC<1:$m$> and a clock signal CLK. The selection codes SC<1:$m$> may be inputted to the pre-determination control circuit 310 such that the pre-determination control circuit 310 may generate the plurality of delay signals. The plurality of delay signals allow the first and second crosstalk compensation circuits 321 and 322 to finely adjust delay amounts for delaying the first and second internal signals IS1 and IS2. The selection codes SC<1:$m$> may be inputted from an external apparatus. For example, in the case where a semiconductor apparatus including the interface circuit 300 is a memory apparatus, the external apparatus may be a processor or a controller. The selection codes SC<1:$m$> may be generated based on a training operation of the semiconductor apparatus including the interface circuit 300 and the external apparatus. The training operation may include, for example, a step in which the external apparatus senses the valid windows or durations of the first and second output signals SO1 and SO2 and a step in which the values of the selection codes SC<1:$m$> are increased or decreased depending on a sensing result. However, it is not intended to limit the embodiments to a specific training operation, and it is to be noted that any training schemes generally known in the art may be used.

Referring to FIG. 3, the interface circuit 300 may further include transmission drivers 331 and 332. The transmission driver 331 may drive the first signal transmission line 301 based on the output of the first crosstalk compensation circuit 321, and thereby, output the first output signal SO1 through the first signal transmission line 301. The transmission driver 332 may drive the second signal transmission line 302 based on the output of the second crosstalk compensation circuit 322, and thereby, output the second output signal SO2 through the second signal transmission line 302. The transmission drivers 331 and 332 may be realized by output driver circuits which are generally known in the art. The interface circuit 300 may further include delay units 341 and 342. The delay units 341 and 342 may delay and output the first and second internal signals IS1 and IS2. The delay units 341 and 342 may delay the first and second internal signals IS1 and IS2 by a fixed delay amount.

Figure 4:
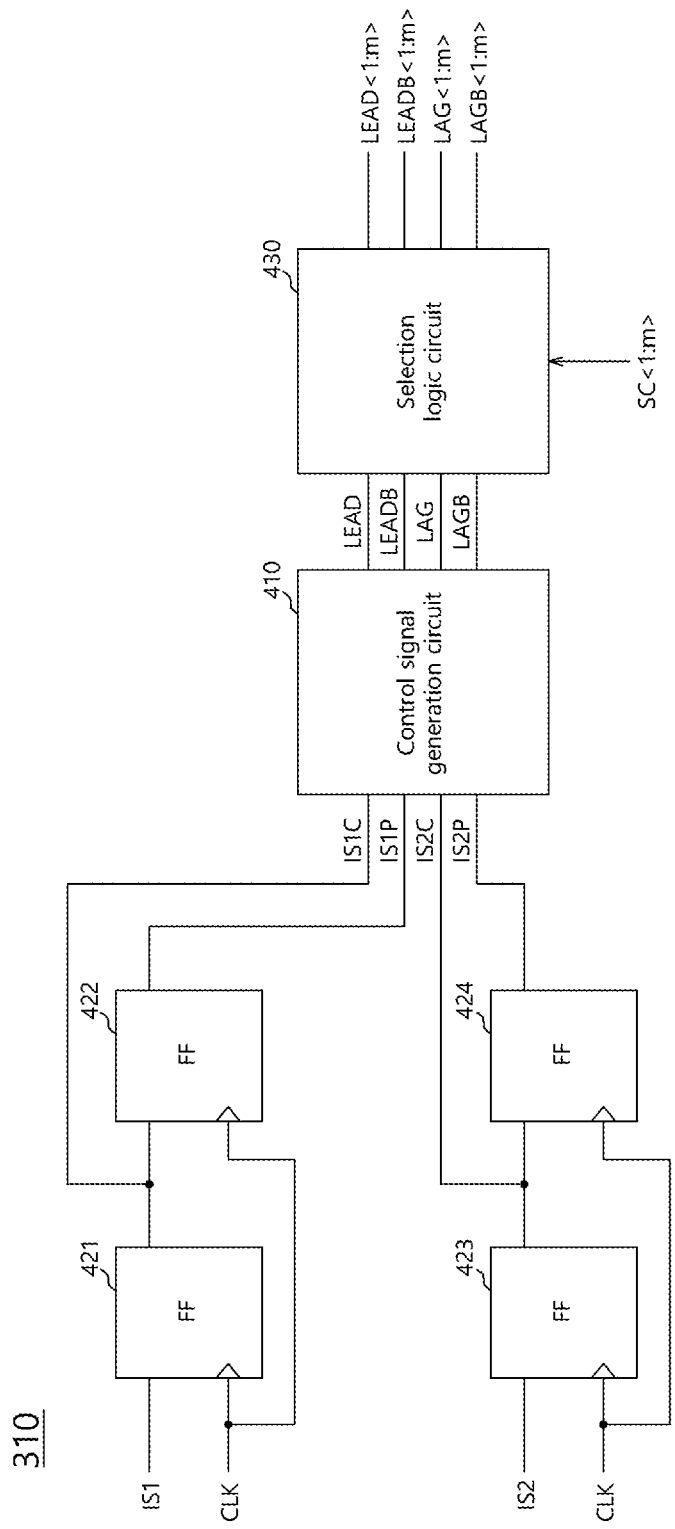
FIG. 4 is a diagram illustrating a representation of an example of the configuration of the pre-determination control circuit illustrated in FIG. 3.

FIG. 4 is a diagram illustrating a representation of an example of a configuration of a pre-determination control circuit 310 illustrated in FIG. 3. Referring to FIG. 4, the pre-determination control circuit 310 may include a control signal generation circuit 410. The control signal generation circuit 410 may sense level variations of the first and second internal signals IS1 and IS2, and generate a lead signal LEAD and a lag signal LAG. The control signal generation circuit 410 may compare a previous level IS1P and a current level IS1C of the first internal signal IS1 and a previous level IS2P and a current level IS2C of the second internal signal IS2, and generate the lead signal LEAD and the lag signal LAG. For example, the control signal generation circuit 410 may disable both the lead signal LEAD and the lag signal LAG in the uncoupled mode, enable the lead signal LEAD and disable the lag signal LAG in the even mode, and disable the lead signal LEAD and enable the lag signal LAG in the odd mode.

The pre-determination control circuit 310 may further include a first flip-flop 421, a second flip-flop 422, a third flip-flop, and a fourth flip-flop 424. Each of the first to fourth flip-flops 421, 422, 423 and 424 may operate in synchronization with the clock signal CLK. The first flip-flop 421 may receive the first internal signal IS1. The second flip-flop 422 may receive the output of the first flip-flop 421. If the clock signal CLK toggles, the first flip-flop 421 may output the current level IS1C of the first internal signal IS1, and the second flip-flop 422 may output the previous level IS1P of the first internal signal IS1. The third flip-flop 423 may receive the second internal signal IS2. The fourth flip-flop 424 may receive the output of the third flip-flop 423. If the clock signal CLK toggles, the third flip-flop 423 may output the current level IS2C of the second internal signal IS2, and the fourth flip-flop 424 may output the previous level IS2P of the second internal signal IS2. The control signal generation circuit 410 may further generate a lead bar signal LEADB and a lag bar signal LAGB. The lead bar signal LEADB may be the complementary signal of the lead signal LEAD, and the lag bar signal LAGB may be the complementary signal of the lag signal LAG. The lead bar signal LEADB and the lag bar signal LAGB may be respectively generated based on the previous level IS1P and the current level IS1C of the first internal signal IS1 and the previous level IS2P and the current level IS2C of the second internal signal IS2.

The pre-determination control circuit 310 may further include a selection logic circuit 430. The selection logic circuit 430 may receive the selection codes SC<1:$m$>, and generate a plurality of delay signals LEAD1 to LEADm, LEADB1 to LEADBm, LAG1 to LAGm and LAGB1 to LAGBm based on the lead signal LEAD, the lag signal LAG, the lead bar signal LEADB and the lag bar signal LAGB. For example, the selection logic circuit 430 may increase the number of delay signals enabled among the plurality of delay signals LEAD1 to LEADm, LEADB1 to LEADBm, LAG1 to LAGm and LAGB1 to LAGBm when the value of the selection codes SC<1:$m$> increases, and decrease the number of delay signals enabled among the plurality of delay signals LEAD1 to LEADm, LEADB1 to LEADBm, LAG1 to LAGm and LAGB1 to LAGBm when the value of the selection codes SC<1:$m$> decreases. As will be further described later, the selection logic circuit 430 may generate the plurality of delay signals LEAD1 to LEADm, LEADB1 to LEADBm, LAG1 to LAGm and LAGB1 to LAGBm to finely adjust a delay amount for delaying the first and second internal signals IS1 and IS2, by being combined with the first and second crosstalk compensation circuits 321 and 322.

Figure 5:
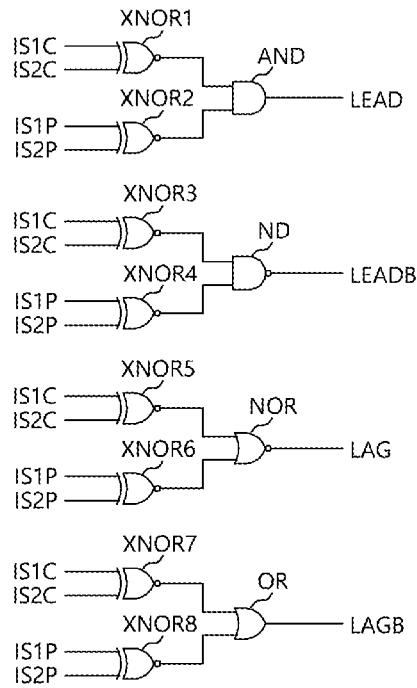
FIG. 5 is a diagram illustrating a representation of an example of the configuration of the control signal generation circuit illustrated in FIG. 4.

FIG. 5 is a diagram illustrating a representation of an example of the configuration of the control signal generation circuit 410 illustrated in FIG. 4. Referring to FIG. 5, the control signal generation circuit 410 may include first to eighth XNOR gates XNOR1 to XNOR8, an AND gate AND, a NAND gate ND, a NOR gate NOR, and an OR gate OR. The first XNOR gate XNOR1, the third XNOR gate XNOR3, the fifth XNOR gate XNOR5 and the seventh XNOR gate XNOR7 may receive the current levels IS1C and IS2C of the first and second internal signals IS1 and IS2. The second XNOR gate XNOR2, the fourth XNOR gate XNOR4, the sixth XNOR gate XNOR6 and the eighth XNOR gate XNOR8 may receive the previous levels IS1P and IS2P of the first and second internal signals IS1 and IS2. The AND gate AND may receive the outputs of the first and second XNOR gates XNOR1 and XNOR2, and generate the lead signal LEAD. The NAND gate ND may receive the outputs of the third and fourth XNOR gates XNOR3 and XNOR4, and generate the lead bar signal LEADB. The NOR gate NOR may receive the outputs of the fifth and sixth XNOR gates XNOR5 and XNOR6, and generate the lag signal LAG. The OR gate OR may receive the outputs of the seventh and eighth XNOR gates XNOR7 and XNOR8, and generate the lag bar signal LAGB. In the uncoupled mode, the control signal generation circuit 410 may disable the lead signal LEAD to a low level, disable the lead bar signal LEADB to a high level, disable the lag signal LAG to a low level, and disable the lag bar signal LAGB to a high level. In the even mode, the control signal generation circuit 410 may enable the lead signal LEAD to a high level, enable the lead bar signal LEADB to a low level, disable the lag signal LAG to the low level, and disable the lag bar signal LAGB to the high level. In the odd mode, the control signal generation circuit 410 may disable the lead signal LEAD to the low level, disable the lead bar signal LEADB to the high level, enable the lag signal LAG to a high level, and enable the lag bar signal LAGB to a low level.

Figure 6:
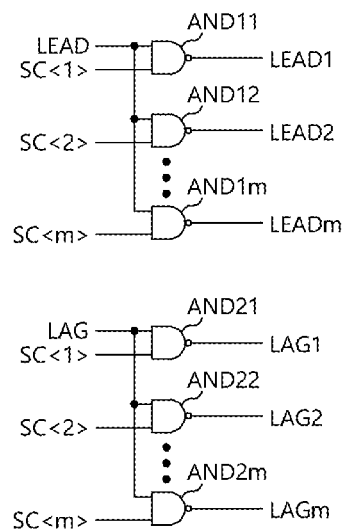
FIG. 6 is a diagram illustrating a representation of an example of the configuration of the selection logic circuit illustrated in FIG. 4.

FIG. 6 is a diagram illustrating a representation of an example of the configuration of the selection logic circuit 430 illustrated in FIG. 4. Referring to FIG. 6, the selection logic circuit 430 may include a plurality of AND gates AND11, AND12, AND1$m$, AND21, AND22 and AND2$m$. Referring to FIG. 6, six AND gates are illustrated for example but the embodiments are not limited in the way. The first AND gate AND11 may receive the first bit SC<1> of the selection codes SC<1:$m$> and the lead signal LEAD. The second AND gate AND12 may receive the second bit SC<2> of the selection codes SC<1:$m$> and the lead signal LEAD. The third AND gate AND1$m$ may receive the m^th bit SC<m> of the selection codes SC<1:$m$> and the lead signal LEAD. The first to third AND gates AND11, AND12 and AND1$m$ may generate the plurality of delay signals LEAD1 to LEADm. When the lead signal LEAD is enabled, the first to third AND gates AND11, AND12 and AND1$m$ may increase the number of delay signals enabled among the plurality of delay signals LEAD1 to LEADm as the value of the selection codes SC<1:$m$> increases. The fourth AND gate AND21 may receive the first bit SC<1> of the selection codes SC<1:*m*> and the lag signal LAG. The fifth AND gate AND22 may receive the second bit SC<2> of the selection codes SC<1:*m*> and the lag signal LAG. The sixth AND gate AND2*m* may receive the m^th bit SC<m> of the selection codes SC<1:*m*> and the lag signal LAG. The fourth to sixth AND gates AND21, AND22 and AND2*m* may generate the plurality of delay signals LAG1 to LAG*m*. When the lag signal LAG is enabled, the fourth to sixth AND gates AND21, AND22 and AND2*m* may increase the number of delay signals enabled among the plurality of delay signals LAG1 to LAGm as the value of the selection codes SC<1:*m*> increases. Referring to FIG. 6, the selection logic circuit 430 may further include a plurality of AND gates which receive the lead bar signal LEADB and the selection codes SC<1:*m*> and a plurality of AND gates which receive the lag bar signal LAGB and the selection codes SC<1:*m*>, to generate the plurality of delay signals LEADB1 to LEADBm and LAGB1 to LAGBm.

Figure 7A:
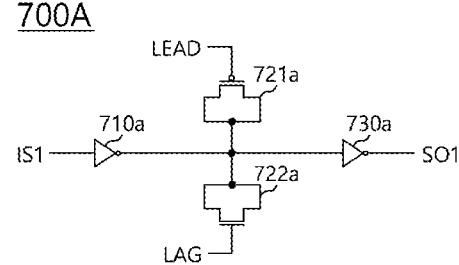
FIGS. 7*a* to 7*c* are diagrams illustrating representations of examples of the configurations of first crosstalk compensation circuits in accordance with the various embodiments.
Figure 7B:
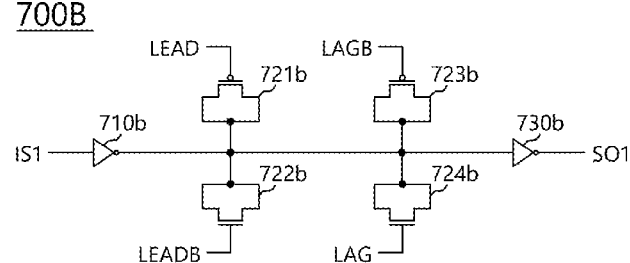
Figure 7C:
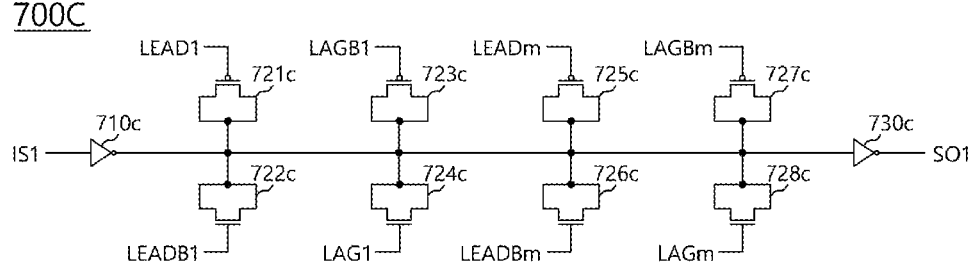

FIGS. 7a to 7c are diagrams illustrating representations of examples of the configurations of first crosstalk compensation circuits 700A, 700B and 700C in accordance with various embodiments. Each of the first crosstalk compensation circuits 700A, 700B and 700C illustrated in FIGS. 7a to 7c may be applied as the first crosstalk compensation circuit 321 illustrated in FIG. 3. The second crosstalk compensation circuit 322 may have substantially the same configuration as the configuration of the first crosstalk compensation circuit 321. Referring to FIG. 7a, the first crosstalk compensation circuit 700A may include a first buffer 710a, a PMOS capacitor 721a, an NMOS capacitor 722a, and a second buffer 730a. The first buffer 710a may buffer the first internal signal IS1. The PMOS capacitor 721a and the NMOS capacitor 722a may be coupled between the first and second buffers 710a and 730a. The PMOS capacitor 721a may be turned on when the lead signal LEAD is disabled to the low level, and delay the output of the first buffer 710a. The NMOS capacitor 722a may be turned on when the lag signal LAG is enabled to the high level, and delay the output of the first buffer 710a. Therefore, the first crosstalk compensation circuit 700a may variably delay the first internal signal IS1 according to whether the lead signal LEAD and the lag signal LAG are enabled, and generate the first output signal SO1.

Referring to FIG. 7b, the first crosstalk compensation circuit 700B may include a first buffer 710b, a first PMOS capacitor 721b, a second PMOS capacitor 723b, a first NMOS capacitor 722b, a second NMOS capacitor 724b, and a second buffer 730b. The first PMOS capacitor 721b, the second PMOS capacitor 723b, the first NMOS capacitor 722b and the second NMOS capacitor 724b may be coupled between the first and second buffers 710b and 730b. The first PMOS capacitor 721b may delay the output of the first buffer 710b when the lead signal LEAD is disabled to the low level. The second PMOS capacitor 723b may delay the output of the first buffer 710b when the lag bar signal LAGB is enabled to the low level. The first NMOS capacitor 722b may delay the output of the first buffer 710b when the lead bar signal LEADB is disabled to the high level. The second NMOS capacitor 724b may delay the output of the first buffer 710b when the lag signal LAG is enabled to the high level. Therefore, the first crosstalk compensation circuit 700B may variably delay the first internal signal IS1 according to whether the lead signal LEAD, the lag signal LAG, the lead bar signal LEADB and the lag bar signal LAGB are enabled, and generate the first output signal SO1.

Referring to FIG. 7c, the first crosstalk compensation circuit 700C may include a first buffer 710c, first to fourth PMOS capacitors 721c, 723c, 725c and 727c, first to fourth NMOS capacitors 722c, 724c, 726c and 728c, and a second buffer 730c. The first to fourth PMOS capacitors 721c, 723c, 725c and 727c and the first to fourth NMOS capacitors 722c, 724c, 726c and 728c may be coupled between the first and second buffers 710c and 730c. Positions relating to odd-numbered PMOS capacitors among the first to fourth PMOS capacitors 721c, 723c, 725c and 727c may be turned on by receiving the plurality of delay signals LEAD1 and LEADm, respectively. Positions relating to even-numbered PMOS capacitors among the first to fourth PMOS capacitors 721c, 723c, 725c and 727c may be turned on by receiving the plurality of delay signals LAGB1 and LAGBm, respectively. Positions relating to odd-numbered NMOS capacitors among the first to fourth NMOS capacitors 722c, 724c, 726c and 728c may be turned on by receiving the plurality of delay signals LEADB1 and LEADBm, respectively. Positions relating to even-numbered NMOS capacitors among the first to fourth NMOS capacitors 722c, 724c, 726c and 728c may be turned on by receiving the plurality of delay signals LAG1 and LAGm, respectively. The sizes of the first to fourth PMOS capacitors 721c, 723c, 725c and 727c may be different from one another, and the sizes of the first to fourth NMOS capacitors 722c, 724c, 726c and 728c may be different from one another. By including a plurality of PMOS and NMOS capacitors having different sizes, the first crosstalk compensation circuit 700C may delay the first internal signal IS1 by various delay amounts based on the plurality of delay signals LEAD1 to LEADm, LEADB1 to LEADBm, LAG1 to LAGm and LAGB1 to LAGBm. As a consequence, the interface circuit 300 may freely adjust even the differences, for example, between the first to third delay amounts.

FIG. 8 is a representation of an example of a timing diagram to assist in the explanation of the operation of an interface circuit in accordance with an embodiment. The operation of the interface circuit in accordance with an embodiment will be described below with reference to FIGS. 3 to 8. Referring to FIG. 8, it is assumed that the levels of the first and second internal signals IS1 and IS2 vary as illustrated. In a first period A, since the first internal signal IS1 varies from a high level to a low level and the level of the second signal IS2 does not vary, the first period A may be the uncoupled mode. The pre-determination control circuit 310 may disable both the lead signal LEAD and the lag signal LAG based on the level variation of the first and second internal signals IS1 and IS2. The first and second crosstalk compensation circuits 321 and 322 may delay the first and second internal signals IS1 and IS2 by the second delay amount, and generate the first and second output signals SO1 and SO2. The transmission drivers 331 and 332 may drive the first and second signal transmission lines 301 and 302 at a normal time based on the first and second output signals SO1 and SO2.

In a second period B, since both the first and second internal signals IS1 and IS2 vary from the low level to the high level, the second period B may be the even mode. The pre-determination control circuit 310 may enable the lead signal LEAD and disable the lag signal LAG based on the level variations of the first and second internal signals IS1 and IS2. The first and second crosstalk compensation circuits 321 and 322 may delay the first and second internal signals IS1 and IS2 by the first delay amount, and generate the first and second output signals SO1 and SO2. The transmission drivers 331 and 332 may drive the first and second signal transmission lines 301 and 302 earlier than a normal time based on the first and second output signals SO1 and SO2. In a third period C, since both the first and second internal signals IS1 and IS2 vary from the high level to the low level, the third period C may be the even mode. Also, in a fourth period D, since the levels of the first and second internal signals IS1 and IS2 do not vary, the pre-determination control circuit 310 may retain the enabled state of the lead signal LEAD and the disabled state of the lag signal LAG.

In a fifth period E, since the level of the first internal signal IS1 does not vary whereas the second internal signal IS2 varies from the low level to the high level, the fifth period E may be the uncoupled mode. The pre-determination control circuit 310 may disable both the lead signal LEAD and the lag signal LAG. The first and second crosstalk compensation circuits 321 and 322 may delay by the second delay amount and output the first and second internal signals IS1 and IS2, and the transmission drivers 331 and 332 may drive the first and second signal transmission lines 301 and 302 at a normal time based on the first and second output signals SO1 and SO2.

In a sixth period F, the first internal signal IS1 varies from the low level to the high level, and the second internal signal IS2 varies from the high level to the low level. Since the first and second internal signals IS1 and IS2 vary to different levels, the sixth period F may be the odd mode. The pre-determination control circuit 310 may disable the lead signal LEAD and enable the lag signal LAG. The first and second crosstalk compensation circuits 321 and 322 may delay the first and second internal signals IS1 and IS2 by the third delay amount, and generate the first and second output signals SO1 and SO2. The transmission drivers 331 and 332 may drive the first and second signal transmission lines 301 and 302 at a time later than a normal time based on the first and second output signals SO1 and SO2. Similarly, in a seventh period G, since the first and second internal signals IS1 and IS2 vary to different levels, the seventh period G may be the odd mode. The pre-determination control circuit 310 may retain the disabled state of the lead signal LEAD and the enabled state of the lag signal LAG. Accordingly, the transmission drivers 331 and 332 may drive the first and second signal transmission lines 301 and 302 at a time later than a normal time based on the first and second output signals SO1 and SO2.

In an eighth period H, since the level of the first internal signal IS1 does not vary whereas the second internal signal IS2 varies from the high level to the low level, the eighth period H may be the uncoupled mode. The pre-determination control circuit 310 may disable both the lead signal LEAD and the lag signal LAG. The first and second crosstalk compensation circuits 321 and 322 may delay the first and second internal signals IS1 and IS2 by the second delay amount, and generate the first and second output signals SO1 and SO2. The transmission drivers 331 and 332 may drive the first and second signal transmission lines 301 and 302 at a normal time based on the first and second output signals SO1 and SO2. In order to compensate for a coupling or crosstalk due to level variations of signals, the interface circuit 300 may drive adjacent signal transmission lines at different times, based on level variations of signals to be transmitted through the adjacent signal transmission lines. As a consequence, the valid windows or durations of the signals received at the sides of receiver circuits which receive the first and second output signals SO1 and SO2 transmitted from the interface circuit 300 may be widened.

FIG. 9 is a diagram illustrating a representation of an example of a crosstalk occurring between signal transmission lines and a concept for compensating for the crosstalk at the sides of receiver circuits. Referring to FIG. 8, two signal transmission lines 901 and 902 may be adjacent signal transmission lines. Transmitter circuits TX may transmit a first signal S1 through a first signal transmission line 901 and transmit a second signal S2 through a second signal transmission line 902. In the uncoupled mode, when the level of only the first signal S1 of the first and second signals S1 and S2 varies to a high level, a coupling between the first and second signal transmission lines 901 and 902 may not occur. Therefore, the receiver circuits RX may receive the first and second signals S1 and S2 at a reference time tn. In the even mode, when both the first and second signals S1 and S2 vary from a low level to a high level, due to a coupling phenomenon or crosstalk of the first and second signal transmission lines 901 and 902, the receiver circuits RX may receive the first and second signals S1 and S2 at a time tb later than the reference time tn. In the odd mode, when the first signal S1 varies from a low level to a high level and the second signal S2 varies from a high level to a low level, due to a coupling phenomenon or crosstalk of the first and second signal transmission lines 901 and 902, the receiver circuits RX may receive the first and second signals S1 and S2 at a time to earlier than the reference time tn. As described above, even though the transmitter circuits TX drive the first and second signal transmission lines 901 and 902 and transmit the first and second signals S1 and S2 at the same time, the receiver circuits RX may receive the first and second signals S1 and S2 at different times due to the coupling phenomenon or crosstalk of the first and second signal transmission lines 901 and 902 induced by level variations of the first and second signals S1 and S2. Accordingly, the valid windows or durations of the received signals S1 and S2 may be decreased, and the transmission performance between the transmitter circuits TX and the receiver circuits RX may be degraded.

An interface circuit in accordance with an embodiment may receive the first and second signals S1 and S2 at the sides of the receiver circuits RX, and compensate for a crosstalk likely to occur while the first and second signals S1 and S2 are transmitted. In the uncoupled mode, since a transmission delay does not occur in the first and second signals S1 and S2, the interface circuit may generate the first and second signals S1 and S2 as internal signals at a normal time t1. In the even mode, in consideration of that transmission of the first and second signals S1 and S2 is delayed, the interface circuit may generate the first and second signals S1 and S2 as internal signals at a time t2 earlier than the normal time t1. In the odd mode, in consideration of that transmission of the first and second signals S1 and S2 is quickened, the interface circuit may generate the first and second signals S1 and S2 as internal signals at a time t3 later than the normal time t1. As a consequence, the interface circuit may generate internal signals by compensating for a crosstalk due to level variations of the first and second signals S1 and S2, thereby increasing the valid windows or durations of the internal signals and improving communication performance.

Figure 10:
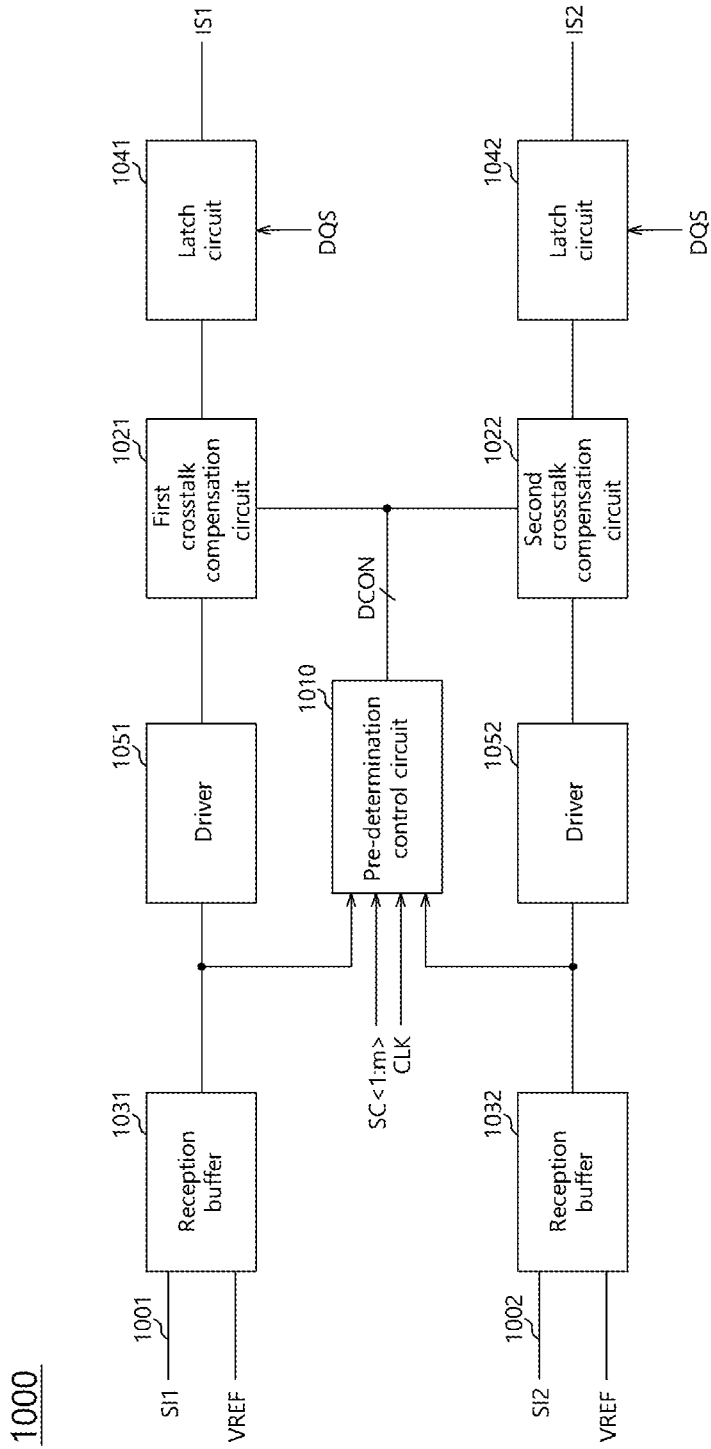
FIG. 10 is a diagram illustrating a representation of an example of the configuration of an interface circuit in accordance with an embodiment.

FIG. 10 is a diagram illustrating a representation of an example of the configuration of an interface circuit 1000 in accordance with an embodiment. Referring to FIG. 10, the interface circuit 1000 may include a configuration for a receiver circuit. The interface circuit 1000 may sense level variations of first and second input signals SI1 and SI2, and, by variably delaying the first and second input signals SI1 and SI2 depending on a sensing result, may generate a first signal IS1 and a second signal IS2. First and second signal transmission lines 1001 and 1002 through which the first and second input signals SI1 and SI2 are transmitted may be adjacent to each other.

The interface circuit 1000 may variably delay the first and second input signals SI1 and SI2 based on the level variations of the first and second input signals SI1 and SI2 received through the first and second signal transmission lines 1001 and 1002. When the first and second input signals SI1 and SI2 vary to the same level, the interface circuit 1000 may delay the respective first and second input signals SI1 and SI2 by a first delay amount, and generate the first and second signals IS1 and IS2. When the level of only any one of the first and second input signals SI1 and SI2 varies, the interface circuit 1000 may delay the respective first and second input signals SI1 and SI2 by a second delay amount, and generate the first and second signals IS1 and IS2. When the first and second input signals SI1 and SI2 vary to different levels, the interface circuit 1000 may delay the respective first and second input signals SI1 and SI2 by a third delay amount, and generate the first and second signals IS1 and IS2. The second delay amount may be larger than the first delay amount, and the third delay amount may be larger than the second delay amount. The interface circuit 1000 may delay the first and second input signals SU and SI2 by the second delay amount in the uncoupled mode, and generate the first and second signals IS1 and IS2. The interface circuit 1000 may delay the first and second input signals SI1 and SI2 by the first delay amount smaller than the second delay amount in the even mode, and generate the first and second signals IS1 and IS2, such that the first and second signals IS1 and IS2 may be generated earlier than a normal time. The interface circuit 1000 may delay the first and second input signals SI1 and SI2 by the third delay amount larger than the second delay amount in the odd mode, and generate the first and second signals IS1 and IS2, such that the first and second signals IS1 and IS2 may be generated later than the normal time.

Referring to FIG. 10, the interface circuit 1000 may include a first reception buffer 1031, a second reception buffer 1032, a pre-determination control circuit 1010, a first crosstalk compensation circuit 1021, and a second crosstalk compensation circuit 1022. The first reception buffer 1031 may be coupled with the first signal transmission line 1001, and receive the first input signal SI1 transmitted through the first signal transmission line 1001. The first reception buffer 1031 may receive the first input signal SI1 by using a reference voltage VREF. For example, the reference voltage VREF may have a level corresponding to one half the swing width of the first input signal SI1, and the first reception buffer 1031 may receive the first input signal SI1 by comparing the levels of the first input signal SI1 and the reference voltage VREF. The second reception buffer 1032 may be coupled with the second signal transmission line 1002, and receive the second input signal SI2 transmitted through the second signal transmission line 1002. The second reception buffer 1032 may receive the second input signal SI2 by using the reference voltage VREF.

The pre-determination control circuit 1010 may receive the first and second input signals SI1 and SI2 received through the first and second reception buffers 1031 and 1032. The pre-determination control circuit 1010 may sense level variations of the first and second input signals SI1 and SI2, and generate a delay control signal DCON depending on a sensing result. The pre-determination control circuit 1010 may have substantially the same configuration and perform substantially the same function as the pre-determination control circuit 310 illustrated in FIGS. 3 and 4. The pre-determination control circuit 1010 may further receive selection codes SC<1:*m*> and a clock signal CLK. The selection codes SC<1:*m*> may be generated based on a training operation in cooperation with an external apparatus which communicates with the interface circuit 1000. The pre-determination control circuit 1010 may operate in synchronization with the clock signal CLK. The first and second crosstalk compensation circuits 1021 and 1022 may variably delay the first and second input signals SI1 and SI2 based on the delay control signal DCON, and generate the first and second signals IS1 and IS2. The first and second crosstalk compensation circuits 1021 and 1022 may have substantially the same configurations and perform substantially the same functions as the first crosstalk compensation circuits 321, 700A, 700B and 700C illustrated in FIGS. 3 and 7a to 7c.

Referring to FIG. 10, the interface circuit 1000 may further include latch circuits 1041 and 1042. The latch circuits 1041 and 1042 may latch the outputs of the first and second crosstalk compensation circuits 1021 and 1022 based on a latch control signal, and generate the first and second signals IS1 and IS2. When the first and second input signals SI1 and SI2 and the first and second signals IS1 and IS2 are data, the latch control signal may be a data strobe signal DQS. The interface circuit 1000 may further include drivers 1051 and 1052. The drivers 1051 and 1052 may repeat the outputs of the first and second reception buffers 1031 and 1032. The drivers 1051 and 1052 may be coupled between the first and second reception buffers 1031 and 1032 and the first and second crosstalk compensation circuits 1021 and 1022. The interface circuit 1000 may variably delay the first and second input signals SI1 and SI2 depending on the level variations of the first and second input signals SI1 and SI2, and compensate for a crosstalk occurred while the first and second input signals SI1 and SI2 are transmitted through the first and second signal transmission lines 901 and 902. As a consequence, the first and second signals IS1 and IS2 may have wide valid windows or durations.

While various embodiments have been described above, it will be understood to those skilled in the art that the embodiments described are examples only. Accordingly, the interface circuit capable of compensating for a crosstalk, and the semiconductor apparatus and the system including the same described herein should not be limited based on the described embodiments.

What is claimed is:

1. A semiconductor apparatus comprising:
   an interface circuit configured to sense level variations between a first signal and a second signal, generate first and second output signals by variably delaying the first and second signals depending on the sensing, and transmit the first and second output signals to first and second signal transmission lines which are adjacent to each other, wherein the first and second signals are delayed by a same delay amount.

2. The semiconductor apparatus according to claim 1, wherein the interface circuit generates the first and second output signals by delaying the first and second signals by a first delay amount based on the first and second signals varying to the same level.

3. The semiconductor apparatus according to claim 2, wherein the interface circuit generates the first and second output signals by delaying the first and second signals by a second delay amount based on a level of only any one of the first and second signals varying, and the second delay amount is larger than the first delay amount.

4. The semiconductor apparatus according to claim 3, wherein the interface circuit generates the first and second output signals by delaying the first and second signals by a third delay amount based on the first and second signals varying to different levels, and the third delay amount is larger than the second delay amount.

5. A semiconductor apparatus comprising:
a pre-determination control circuit configured to sense level variations of a first signal and a second signal, and generate a delay control signal depending on the sensing;
a first crosstalk compensation circuit configured to variably delay the first signal based on the delay control signal, and generate a first output signal; and
a second crosstalk compensation circuit configured to variably delay the second signal based on the delay control signal, and generate a second output signal.

6. The semiconductor apparatus according to claim 5, wherein the pre-determination control circuit senses level variations of the first signal and the second signal, and generates a lead signal and a lag signal.

7. The semiconductor apparatus according to claim 6, wherein the pre-determination control circuit enables the lead signal and disables the lag signal based on the first and second signals varying to the same level.

8. The semiconductor apparatus according to claim 7, wherein the pre-determination control circuit disables both the lead signal and the lag signal based on a level of only any one of the first and second signals varying.

9. The semiconductor apparatus according to claim 8, wherein the pre-determination control circuit disables the lead signal and enables the lag signal based on the first and second signals varying to different levels.

10. The semiconductor apparatus according to claim 9, wherein the first crosstalk compensation circuit delays the first signal by a first delay amount based on the lead signal being enabled, delays the first signal by a second delay amount larger than the first delay amount based on both the lead signal and the lag signal being disabled, and delays the first signal by a third delay amount larger than the second delay amount based on the lag signal being enabled.

11. The semiconductor apparatus according to claim 9, wherein the second crosstalk compensation circuit delays the second signal by a first delay amount based on the lead signal being enabled, delays the second signal by a second delay amount larger than the first delay amount based on both the lead signal and the lag signal being disabled, and delays the second signal by a third delay amount larger than the second delay amount based on the lag signal being enabled.

12. The semiconductor apparatus according to claim 5, wherein the pre-determination control circuit further receives selection codes which are generated by a training operation in cooperation with an external apparatus, and generates a plurality of delay signals according to the selection codes.

13. The semiconductor apparatus according to claim 12, wherein the first and second crosstalk compensation circuits adjust delay amounts for delaying the first and second signals, based on a number of delay signals enabled from the plurality of delay signals.

14. A semiconductor apparatus comprising:
an interface circuit configured to receive a first input signal and a second input signal transmitted through first and second signal transmission lines which are adjacent to each other, and generate first and second signals by variably delaying the first and second input signals based on level variations between the levels of the first and second input signals, wherein the first and second signals are delayed by a same delay amount.

15. The semiconductor apparatus according to claim 14, wherein the interface circuit generates the first and second signals by delaying the first and second input signals by a first delay, second delay, or third delay amount based on a comparison between when the first and second input signals were received and a reference time.

16. The semiconductor apparatus according to claim 15, wherein the third delay amount is greater than the second delay amount and the second delay amount is greater than the first delay amount.

17. The semiconductor apparatus according to claim 15, wherein the first and second signals are generated by delaying the first and second input signals by the first delay amount if the first and second input signals were received at the reference time.

18. The semiconductor apparatus according to claim 15, wherein the first and second signals are generated by the second delay amount if the first and second input signals were received at a time later than the reference time.

19. The semiconductor apparatus according to claim 15, wherein the first and second signals are generated by the third delay amount if the first and second input signals were received at a time earlier than the reference time.

20. The semiconductor apparatus according to claim 1, wherein the first and second signals are variably delayed to compensate for crosstalk between the first and second signals.

21. The semiconductor apparatus according to claim 14, wherein the first and second input signals are variably delayed to compensate for crosstalk between the first and second input signals.

* * * * *